UNITED STATES PATENT OFFICE.

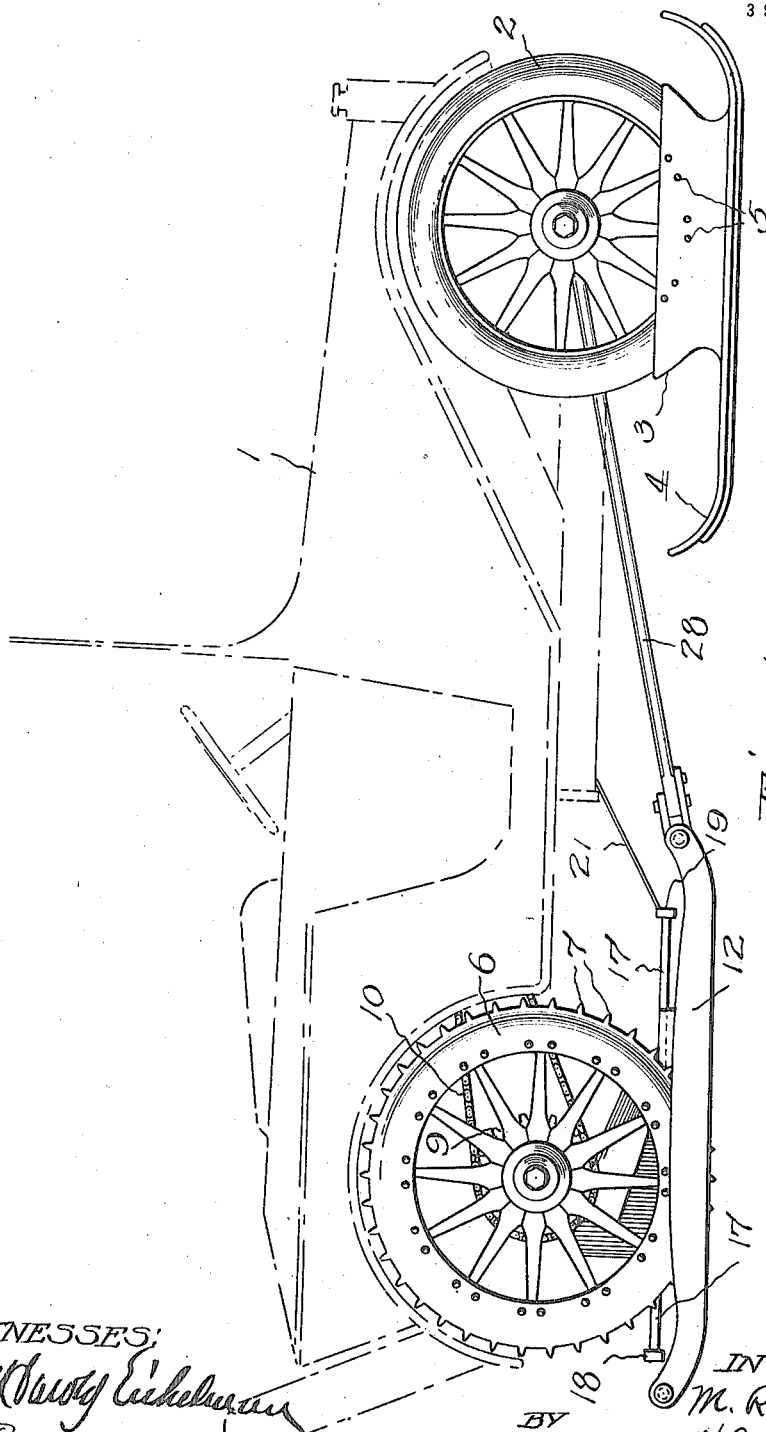

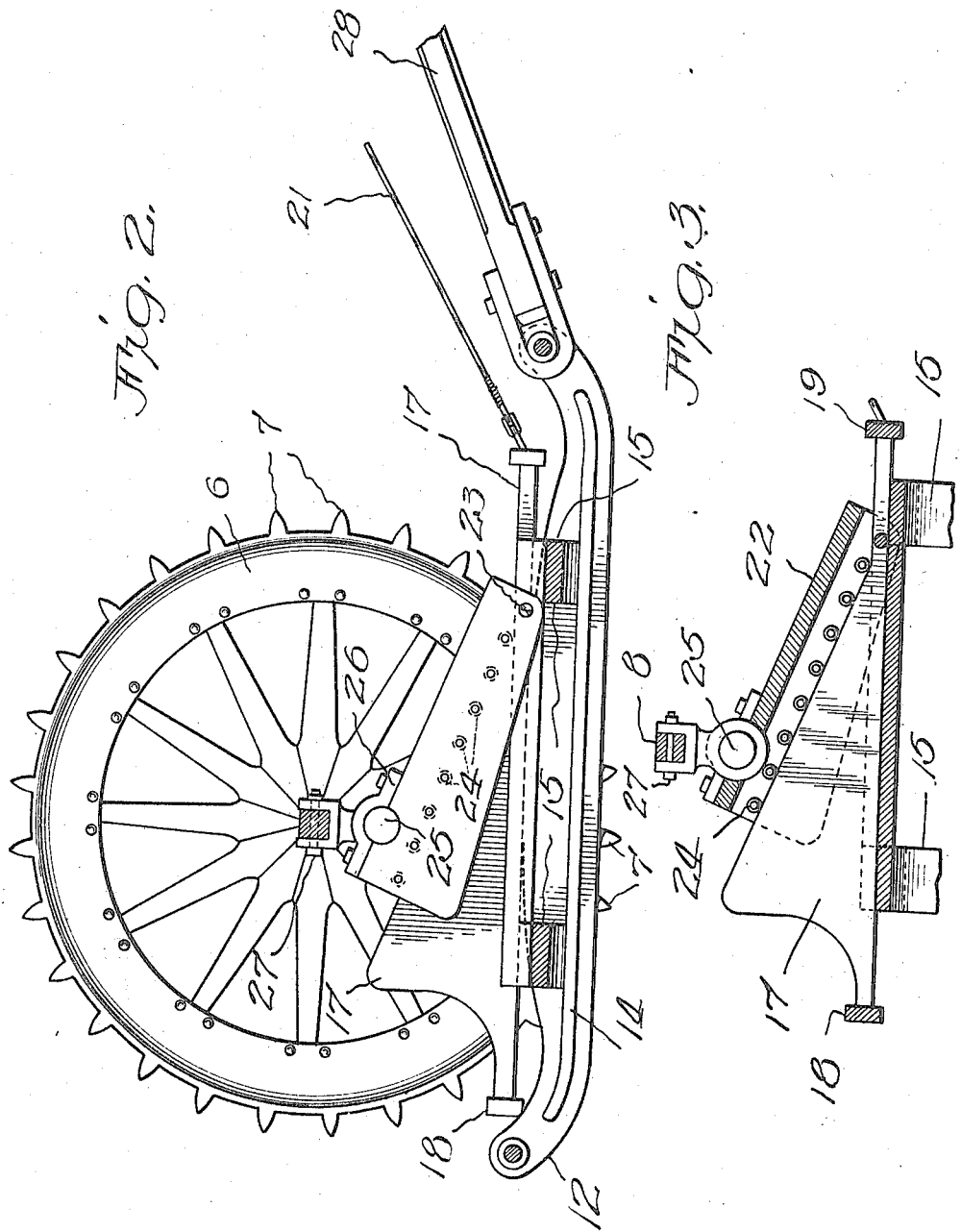

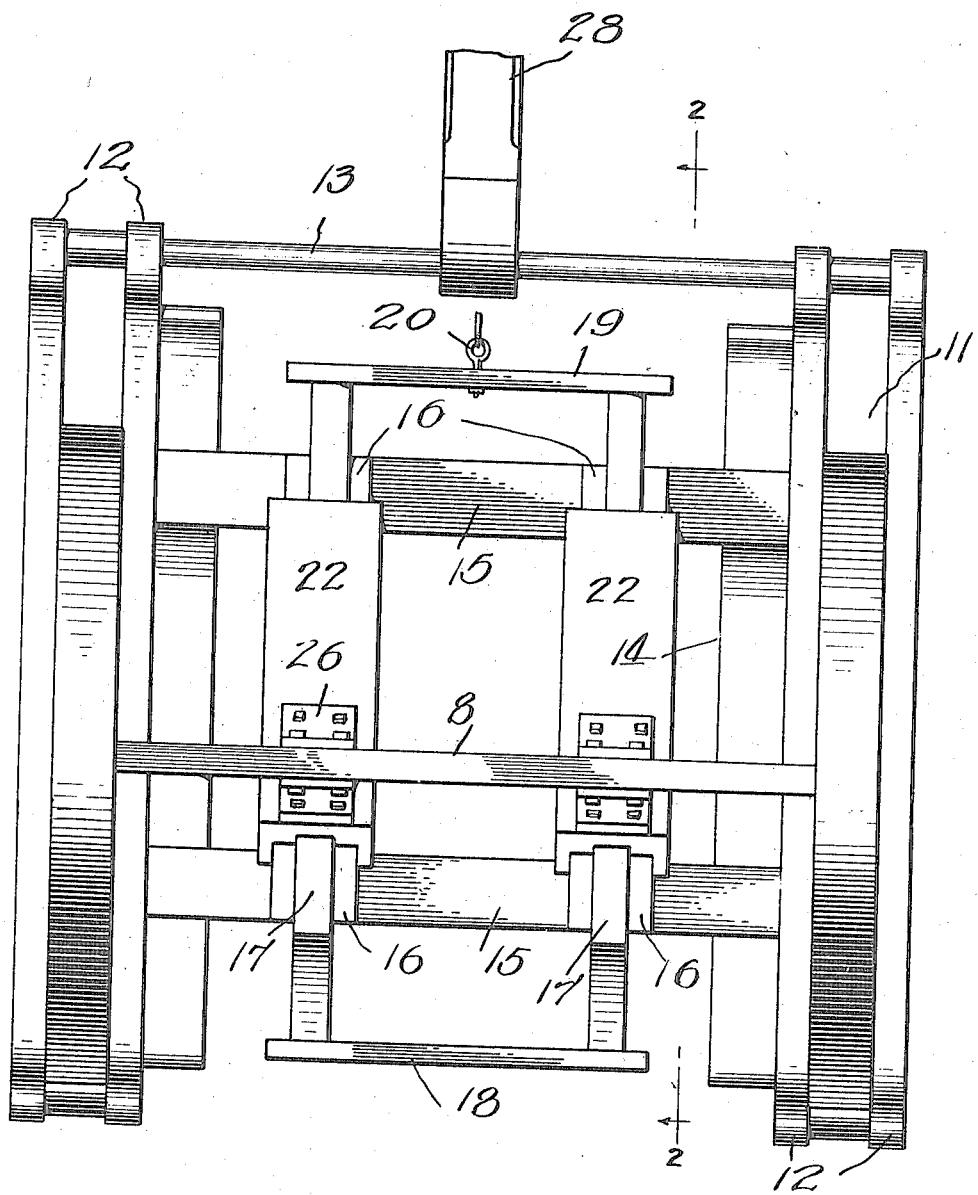

MIELI ROHKEA JARTTI, OF GLENCOE, WYOMING.

SLED ATTACHMENT FOR AUTOMOBILES.

1,267,871. Specification of Letters Patent. Patented May 28, 1918.

Application filed January 10, 1917. Serial No. 141,603.

*To all whom it may concern:*

Be it known that I, MIELI R. JARTTI, a subject of the Czar of Russia, residing at Glencoe, in the county of Lincoln and State of Wyoming, have invented certain new and useful Improvements in Sled Attachments for Automobiles, of which the following is a specification.

This invention relates to improvements in sled atachments for automobiles and it contemplates the substitution of toothed drive wheels for the rear drive wheels of motor vehicles and the provision of runners to support the vehicle, the drive wheels operating through suitable openings in the rear runners of the vehicle. A further object is to provide means for manually raising or lowering the drive wheels with relation to the runners, while the vehicle is in motion if desired, to facilitate the operation of the vehicle over snow or ice. With the foregoing and other objects in view the invention consists in the combination and arrangement of parts to be hereinafter fully described in this specification, pointed out in the appended claims and illustrated in the accompanying drawings which form a part of the specification and in which—

Figure 1 is a side elevation of a motor vehicle constructed along the lines of my invention.

Fig. 2 is a sectional view taken on line 2—2 of Fig. 4.

Fig. 3 is a fragmentary sectional view illustrating the means employed for raising and lowering the drive wheels with relation to the runners.

Fig. 4 is a top plan view of Fig. 2.

Like reference characters denote corresponding parts throughout the several views.

The reference numeral 1 denotes the body of the vehicle provided with the usual front wheels 2 which are supported in the cups 3 of front runners 4, said runners being firmly retained in position by suitable bolts 5. The ordinary pneumatic tired drive wheels of the vehicle are displaced by the drive wheels 6 having spurs 7 that engage with the snow or ice road to propel the vehicle. The wheels 6 are connected by the stationary axle 8 and said wheels are provided with the sprocket wheels 9 over which the driving chains 10 run to transmit power from the engine shaft. The drive wheels 6 rotate through longitudinal openings 11 formed in the rear runners 12, said runners being connected at their front ends by the rod 13. The runners 12 are formed along their relatively inner lateral faces with the ledges 14 to which the cross beams 15, 15 are secured, the ends of said beams being curved downwardly to engage with said ledges and the body portions of the beams being raised from the ends as clearly shown in Fig. 2.

The beams 15, 15 are connected by the trough-like members 16, 16 which are made fast to said beams and in the said members 16 the wedge blocks 17, 17 are slidably arranged, the ends of said wedge blocks protruding beyond the ends of the trough-like members and being connected at the rear of the said members by a cross bar 18 and in front of said members by the draft bar 19. An eyebolt 20 is made fast to the said draft bar 19 and a wire cord 21 leads from said eyebolt to and about a manually operable rotary drum (not shown) which may be suitably located near the chauffeur's seat to make it easy of access. The said drum shall be provided with an ordinary locking dog to hold it at an adjusted position. As the drum is rotated in one direction the cord 21 is caused to move the wedge blocks through the troughs 16 toward the front end of the machine.

To the sides of the trough-like members 16 bifurcated straddle blocks 22 are pivotally secured by the pivot bolts 23, said straddle blocks tapering from their free or non-pivoted ends toward their pivoted ends and being adapted to straddle or partly encompass the wedge blocks 17, the inclined surfaces of which are adapted for engagement with roller bearings 24 extending transversely through said straddle blocks. The said straddle blocks serve as bearings for the pivotally carried stubs 25 which are retained in operative position by the straps 26 bolted to said straddle blocks, the ends of said stubs extending to the axle 8 to which they are secured by bolts 27. The rod 13 aforesaid is slidably connected by draft bar 28 to the cross bar connecting the front stub axles of the vehicle.

The operation is as follows: To raise the drive wheels 6 with relation to the runners 12 the operator winds the cord 21 upon the drum thus moving the wedge blocks forward in the trough-like members 16 and causing said blocks to ride the non-pivoted ends of said straddle blocks away from said runners 12 thereby raising the said wheels 6, the cord 21 is, of course locked or secured fast by its drum in adjusted position. To lower the wheels 6 the cord 21 is slacked when the weight of the vehicle will, through the medium of the straddle blocks force the wedge blocks backward through the members 16 thus lowering said wheels 6. This operation can be performed by the chauffeur readily while the vehicle is in motion. Fig. 2 of the drawing illustrates the straddle blocks 22 in raised position. When it is desired to give more purchase or driving force to the drive wheels the cable 21 is slacked to allow the wedge blocks to recede and permit the wheels to lower.

What is claimed is:—

1. A sled attachment for motor vehicles, rear runners having openings to receive the vehicle drive wheels, wedge blocks slidably disposed above said rear runners, manually operable means for actuating said wedge blocks, pivotally hung straddle blocks engaging and operable by said wedge blocks and supporting means for said vehicle drive wheels carried by said straddle blocks.

2. A sled attachment for motor vehicles, rear runners having openings to receive the vehicle drive wheels, trough-like members carried by said rear runners, wedge blocks slidably disposed in said trough-like members, straddle blocks pivotally connected to the sides of said trough-like members and contacting with said wedge blocks and supporting means for said vehicle drive wheels carried by said straddle blocks.

3. A sled attachment for motor vehicles, rear runners having openings to receive the vehicle drive wheels, trough-like members carried by said rear runners, wedge blocks slidably disposed in said trough-like members, straddle blocks pivotally and terminally connected to said trough-like members, roller bearings carried by said straddle blocks and engaging with said wedge blocks and supporting means for said straddle blocks and engaging with said wedge blocks and supporting means for said vehicle drive wheels carried by said straddle blocks.

4. A sled attachment for motor vehicles, rear runners having openings to receive the vehicle drive wheels, trough-like members parallel with and carried by said rear runners, wedge blocks slidably disposed in said trough-like members, straddle blocks pivotally and terminally connected to said trough-like members and embracing said wedge blocks, roller bearings carried by said straddle blocks and engaging with the beveled faces of said wedge blocks and means for supporting said vehicle drive wheels carried by said straddle blocks.

5. A sled attachment for motor vehicles, rear runners having openings to receive the vehicle drive wheels, trough-like members fast to said rear runners, wedge blocks slidably disposed in said trough-like members, straddle blocks pivotally and terminally connected to said trough-like members, the sides of said straddle blocks overlapping the sides of said wedge blocks, roller bearings carried by said straddle blocks and bearing upon the inclined faces of said wedge blocks and stub shafts carried by said straddle blocks and supporting the said drive wheels.

6. A sled attachment for motor vehicles, rear runners having openings to receive the vehicle drive wheels, a stationary axle connecting said drive wheels, trough-like members fast to said rear runners, wedge blocks slidably disposed in said trough-like members, straddle blocks pivotally connected to said trough-like members and engaging with said wedge blocks, stub shafts movably carried by said straddle blocks and bolted to said stationary shaft, and manually operable means for moving said wedge blocks with relation to said trough-like members.

In testimony that I claim the foregoing as my own I have hereto affixed my signature in the presence of two subscribing witnesses.

MIELI ROHKEA JARTTI.

Witnesses:
 MATT MAGI,
 TUOMAS SILLI.

Copies of this patent may be obtained for five cents each, by addressing the "Commissioner of Patents, Washington, D. C."